WILLIAM CHICKEN
Improvement in Feeding Mechanism for Button-Hole Sewing Machines.
No. 124,252.  Patented March 5, 1872.
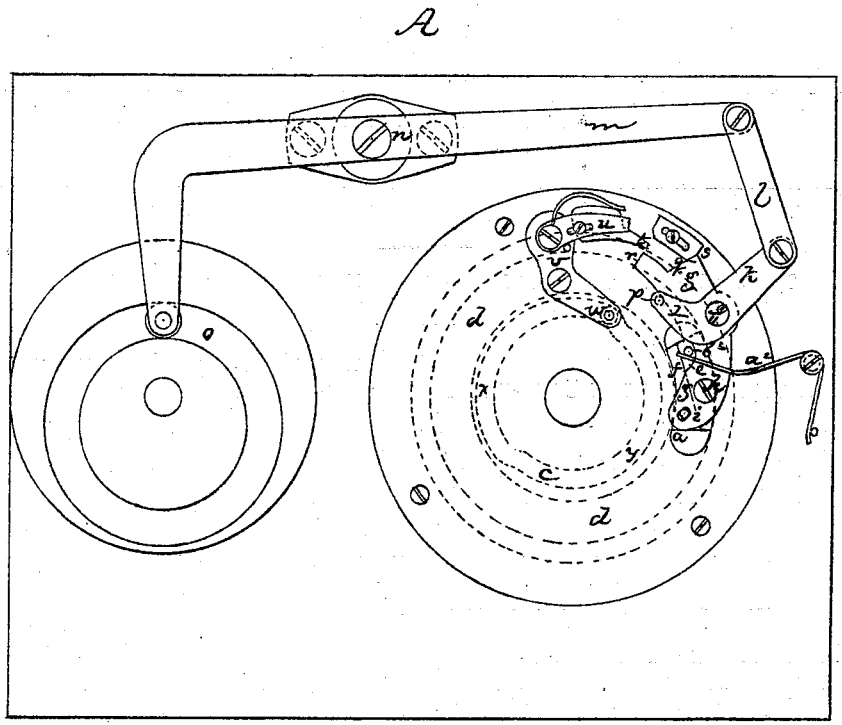
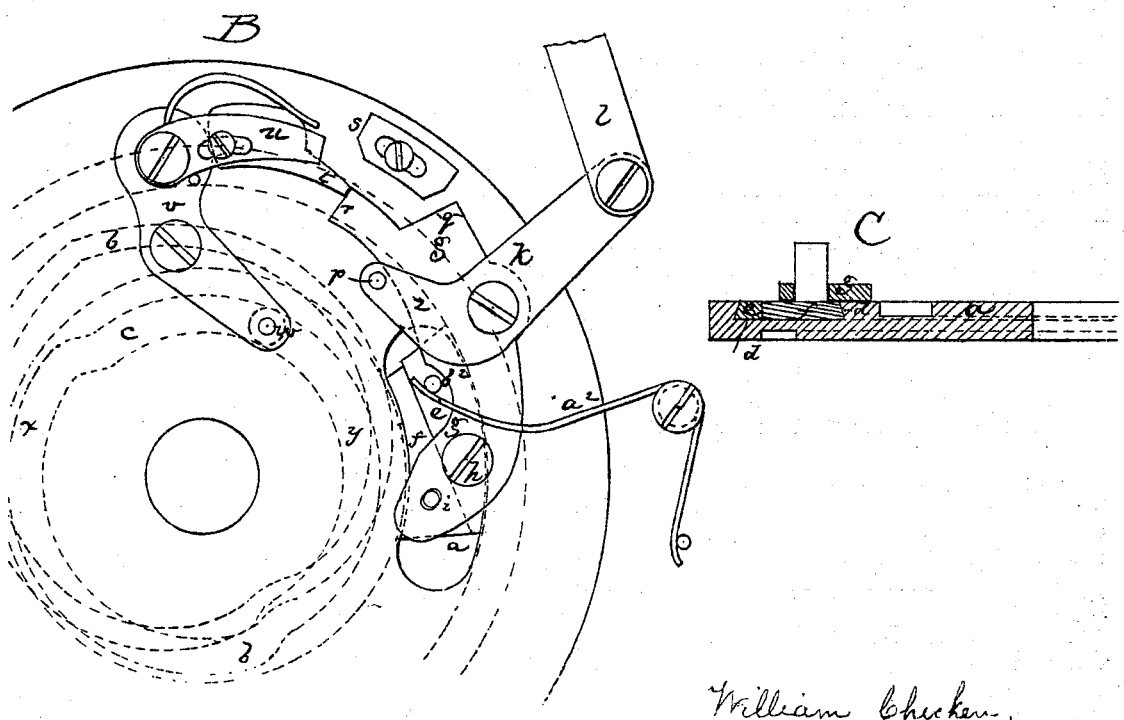

124,252

UNITED STATES PATENT OFFICE.

WILLIAM CHICKEN, OF CHELSEA, ASSIGNOR TO AMOS L. WOOD, TRUSTEE, OF BOSTON, MASSACHUSETTS.

IMPROVEMENT IN FEEDING MECHANISMS FOR BUTTON-HOLE SEWING-MACHINES.

Specification forming part of Letters Patent No. 124,252, dated March 5, 1872.

*To all whom it may concern:*

Be it known that I, WILLIAM CHICKEN, of Chelsea, in the county of Suffolk and State of Massachusetts, have invented an Improved Friction-Feed Mechanism for Button-Hole Machines, &c; and I do hereby declare that the following, taken in connection with the drawing which accompanies and forms part of this specification, is a description of my invention sufficient to enable those skilled in the art to practice it.

United States Letters Patent No. 72,794, dated January 7, 1868, were granted to me for an improvement in effecting the feed movement of the cloth-clamp wheel or disk, in what are known as Union Button-Hole Machines. In the earlier machines this disk "receives its rotation from a pawl acting on ratchet-teeth cut in the edge of the disk, the fault of this being that the disk can only be moved in rotation at each intermission, an amount of angle which is determined by the action of the pawl on one, two, or more teeth, there being no way in which the movements of the disk can be made through the space represented by any fraction of one of the ratchet-teeth;" and the object of the invention, shown in said patent No. 72,794, was "to remedy the defect mentioned by providing a means by which the movements of the disk may be made whatever is desired, instead of being confined to fixed divisions of a circle, like those of ratchet-teeth."

The primary object of my present invention is the same as was the object of the invention shown in said patent, the desired result being accomplished, however, by a more direct application of the feed mechanism to the rotating clamp-disk.

United States Letters Patent No. 107,001, dated September 6, 1870, were also granted to me, one part of the invention shown in said patent relating to a means for automatically effecting the change in the feed movement for the eye-part and slit-part of the button-hole, respectively; and my present invention embraces an improved method of effecting the same result, as also an improvement in the construction of the friction-feed devices.

My invention consists, primarily, in making the clamp-disk with provision for direct application thereto of the griping devices of a friction-feed mechanism, and combining therewith the mechanism for operating the friction-feed pawls, said mechanism and the disk, preferably, having directly connecting with them the devices by which change of feed movement for the eye and slit is automatically effected.

The drawing represents the mechanism or part of the machine embodying my invention.

$a$ denotes the rotary clamp-disk, having cut in its upper surface the cam-groove $b$, that imparts requisite movements to the cloth-clamp, and in its opposite surface a cam-groove, $c$, that controls the devices for producing the automatic change of the stitch for the eye and slit. In the under surface of the disk I also cut or form a guide-slot, $d$, for receiving the friction-pawls, this slot being made wide enough to receive two pawls or pawl-wedges, $e f$, to one of which the actuating lever $g$ is pivoted, as seen at $h$, while to the other the short arm of the lever is pivoted, as seen at $i$. The outer edges of the respective pawls are made circular, to correspond to the curves of the opposite sides of the circular slot $d$, while the inner edges of the pawls abut and are made straight, each pawl being a wedge, with one circular or curved side, and one straight side. The long arm of the lever $g$ is pivoted to a lever, $k$, one arm of which is connected, by a link, $l$, to a lever, $m$, fulcrumed at $n$, and having reciprocating movement imparted to it by a cam, $o$, into which a pin projects from the lever, the other arm of said lever $k$ having a pin, $p$, contact of which with the edge of the pawl-lever determines the movement or commencement of movement of the pawl-lever. The rear end of the pawl-lever has two faces, $q r$, one of which is brought into contact, at proper times, with a stop, $s$, and the other, at proper times, into contact with a stop, $t$. The stop $t$ is fixed to an arm, $u$, attached to or connected with one arm of a lever, $v$, whose other arm has a pin, $w$, extending into the cam-groove $c$ of the clamp-disk $a$, the cam-groove being composed of two parts, each concentric with the center of motion of the disk, but eccentric with the other, and the two being connected as shown in said patents 72,974 and 107,001. When the pin is in the part $y$ of the cam-groove $c$ the end of the arm $t$ stands in the position seen at B, in the path of back movement of the face $r$ of the lever, the stitches being then formed along the slit of the button-hole; but when the part $x$ of the cam-groove reaches the pin $w$ the arm $t$ is thrown out of the path of movement of the face $r$, and the pawl-lever is then thrown further back at each back movement, or until the face $q$ comes against the stop $s$, thereby insuring a longer feed movement of the disk, the forward or feed movement of the pawl-lever being always to a fixed point, but such movement commencing from a point determined by the extent of back movement of said lever, the lever moving back until arrested either by the stop $s$ or the stop $t$, and its length of forward movement being greater or less, in accordance with the particular stop which arrests it. The length of either the eye-stitch or the slit-stitch is adjustably regulated by making each stop $s$ $t$ adjustable in position, as will be readily understood. When the link $l$ is moved forward it causes the lever $k$ to press the long arm of the pawl-lever outwardly, thereby causing the arm $z$ to drive the pawl-wedge $f$ against the pawl-wedge $e$, causing the outer edge of each to bind against the adjacent wall or edge of the pawl-groove, the forward movement of the pawl-lever then effecting the feed movement of the clamp-disk. When the pawl-lever starts it first loosens the grip of the pawl-wedge $f$ upon the pawl-wedge $g$, and then draws back both pawls without their imparting movement to the clamp-disk, the back-movement of the pawl-lever being effected by the movement of the link $l$ and lever $k$, (actuated from the cam,) and the action of a spring, $a^2$, upon a pin, $b^2$, projecting from the pawl-wedge. The movement of the link $l$ being fixed or constant, while the back movement of the pawl-lever is determined by the position of the stops $s$ $t$, and the particular one of them against which the pawl-lever is arrested, provision is made for the lost motion by means of the lever $k$, which moves the lever $g$, and swings with respect thereto, the pin $p$ striking the lever, when it and the pawl-lever will move forward together or as one. To increase the friction of the pawl-levers upon the clamp-disk the walls of the groove are inclined, as seen at C, the width of the groove increasing from its mouth, and the edges of the pawl-wedges are similarly beveled, as seen at C, so that, as the pawl-wedges are forced against said walls, their curved edges act as wedges laterally, and the upper broad surfaces are also forced against the broad surface of the groove. By making the disk itself with the friction-pawl receiving-groove, and applying the friction-pawls and the eye and slit-stitch regulating mechanism directly to the disk, I dispense with the necessity of employing the intermediate-gear mechanism shown in my aforesaid patents, and obtain all the advantages obtained by the gear-and-friction pawl mechanism shown in said patents.

I claim—

1. The clamp-disk $a$, formed with the slot $d$, for receiving the friction-pawl wedges, and having the friction-pawl mechanism, and the mechanism for automatically regulating the change of stitch for the eye and slit, relatively arranged, and operating substantially as shown and described.

2. The friction pawls or pawl-wedges $e$ $f$, each made with one curved edge to fit the circular wall of the groove $d$, and with an inner straight edge, the two inner edges sliding upon each other, substantially as shown and described.

3. The friction-pawl groove $c$, made with the inclined edges or walls, and the pawls $e$ $f$, made with correspondingly-inclined edges fitting thereinto, substantially as shown and described.

Executed this 11th day of December, A. D. 1871.

WM. CHICKEN.

Witnesses:
FRANCIS GOULD,
M. W. FROTHINGHAM.